US008924487B2

(12) United States Patent
Makam et al.

(10) Patent No.: US 8,924,487 B2
(45) Date of Patent: Dec. 30, 2014

(54) METHODS AND SYSTEMS FOR MANAGING SUPPORT CASES BASED ON SUPPORT ISSUES RECEIVED BY WAY OF SOCIAL MEDIA OUTLETS

(75) Inventors: Chethan Makam, Irving, TX (US); Swapneel H. Desai, Dallas, TX (US); Gurucharan Manadavadiprakash, Carrollton, TX (US); Vittal Gunturu, Flower Mound, TX (US); Zouhair Sebati, Edgewater, NJ (US); Fariborz Ebrahimi, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 569 days.

(21) Appl. No.: 12/876,359

(22) Filed: Sep. 7, 2010

(65) Prior Publication Data

US 2012/0060096 A1 Mar. 8, 2012

(51) Int. Cl.
*G06F 15/16* (2006.01)
*G06Q 30/00* (2012.01)
*G06Q 50/00* (2012.01)

(52) U.S. Cl.
CPC ................ *G06Q 50/01* (2013.01); *G06Q 30/00* (2013.01)
USPC .......................................................... 709/206

(58) Field of Classification Search
CPC ............................. G06Q 30/016; G06Q 50/01
USPC .......................................................... 709/206
See application file for complete search history.

(56) References Cited

U.S. PATENT DOCUMENTS

| | | | | |
|---|---|---|---|---|
| 2003/0208396 | A1* | 11/2003 | Miller et al. | 705/14 |
| 2004/0117383 | A1* | 6/2004 | Lee et al. | 707/100 |
| 2008/0040427 | A1* | 2/2008 | Shroff et al. | 709/204 |
| 2008/0040673 | A1* | 2/2008 | Zuckerberg et al. | 715/745 |
| 2008/0288277 | A1* | 11/2008 | Fasciano | 705/1 |
| 2009/0254456 | A1* | 10/2009 | Sarbaev et al. | 705/27 |

* cited by examiner

*Primary Examiner* — Vivek Srivastava
*Assistant Examiner* — Nicholas Celani

(57) ABSTRACT

Exemplary systems and methods for managing support cases based on support issues received by way of social media outlets are disclosed. An exemplary method includes a social media management subsystem receiving data representative of a support issue by way of a social media outlet, establishing a support case based on the support issue, displaying a portal configured to facilitate management of a plurality of support cases including the support case, receiving a request to assign the support case to one or more backend support subsystems, transmitting data representative of the support case to the one or more backend support subsystems, and monitoring one or more actions performed by the one or more backend support subsystems to address the support issue. Corresponding methods and systems are also disclosed.

24 Claims, 9 Drawing Sheets

METHODS AND SYSTEMS FOR MANAGING SUPPORT CASES BASED ON SUPPORT ISSUES RECEIVED BY WAY OF SOCIAL MEDIA OUTLETS

BACKGROUND INFORMATION

Social media outlets have become a fundamental means for social interaction between users across the globe. Through social media outlets, users are able to share information regarding almost any topic. For example, a user may use social media outlets to share information regarding daily activities, educational information, information regarding professional services, information regarding product reviews, etc.

However, in some instances, social media outlets may be used to propagate negative information that could be harmful to a person or an organization (e.g., a business). For example, users may utilize social media outlets to distribute complaints regarding goods or services provided by an organization. Because the distribution of information by way of social media outlets can be nearly instantaneous as well as viral, a user's complaints can be distributed to thousands of other users in a very short time period. This widespread distribution of negative information about the organization can be damaging to the organization's brand, good will, and/or business prospects. Accordingly, if left unchecked, the distribution of information by way of social media outlets may have harmful consequences.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
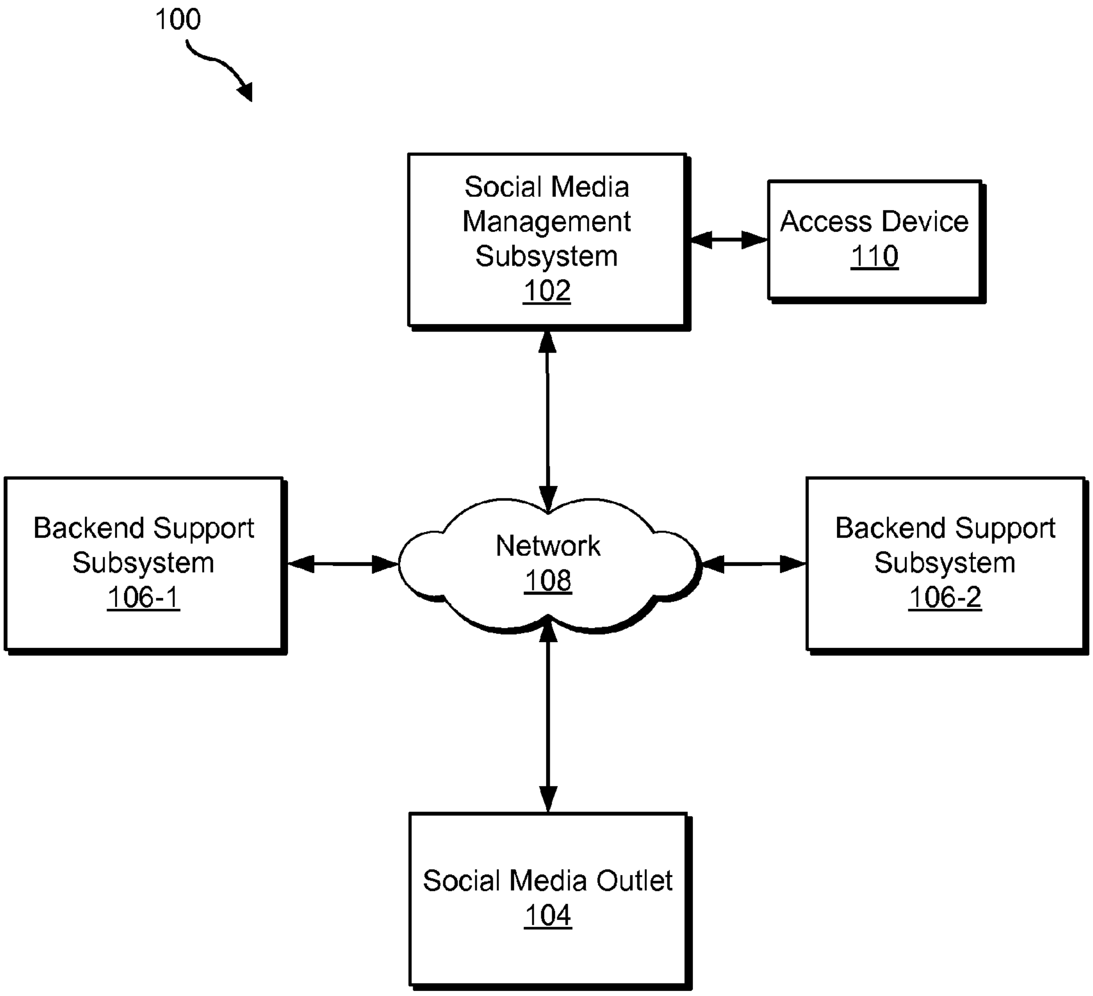
FIG. 1 illustrates an exemplary social media management system according to principles described herein.

Exemplary methods and systems for managing support cases based on support issues received by way of social media outlets are described herein. In some examples, a social media management subsystem receives, by way of a social media outlet, data representative of a support issue provided by a user of the social media outlet, establishes a support case based on the support issue, and displays a portal configured to facilitate management of a plurality of support cases including the support case. The social media management subsystem may be further configured to receive a request to assign the support case to one or more backend support subsystems, transmit data representative of the support case to the one or more backend support subsystems, and monitor one or more actions performed by the one or more backend support subsystems to address the support issue.

As used herein, a "support issue" may represent and/or include any complaint, inquiry, request, comment, critique, concern, controversy, matter, problem, or other issue provided by a user by way of a social media outlet. For example, a support issue may include a communication (e.g., an email, a post, an instant message, etc.) including a complaint or inquiry associated with a good or service provided by an organization (e.g., a business, social organization, community organization, or other group). In some examples, the support issue may be related to one or more services (e.g., network services, television services, wireless communication services, etc.) provided by a service provider. For example, the support issue may include a complaint or inquiry regarding a quality of services provided by the service provider, a bill for services provided by the service provider, a hardware device provided by the service provider, a promotion provided by the service provider, a disruption in services (e.g., a service outage), and/or any other suitable complaint or inquiry associated with the service provider. It will be understood that, although examples provided herein may relate to a service provider, the methods and systems described herein may be employed by any suitable organization within any suitable industry.

A support issue may be the basis for a support case. As used herein, a "support case" may include a compilation of information (e.g., one or more electronic files storing information) related to a support issue upon which the support case is based and/or to a user who provides the support issue. For example, a support case may include user information (e.g., contact information, account information, etc.), technical information (e.g., technical information related to services and/or hardware provided to the user), billing information (e.g., information related to past and present bills associated with the user), promotional information (e.g., information related to promotions available to the user), communication information (e.g., information including and/or associated with communications provided by or to the user), information regarding a status of the support case, information regarding a priority of the support case, information regarding a source (e.g., a social media outlet) through which the support issue was provided, information regarding the content of the support issue, and/or any other information associated with the support issue and/or the user.

As used herein, a "backend support subsystem" may include any backend system or subsystem of an organization. For example, a backend support subsystem may be associated with a particular department and/or employee (e.g., a customer service agent) of a business. To illustrate, a particular backend support subsystem may be associated with a billing department, a technical support department, a sales and marketing department, an Internet services department, a television services department, a hardware department, a customer services department, one or more employees associated with these departments, and/or any other department of a business. In some examples, a backend support subsystem may be configured to perform one or more actions unique to a department with which the backend support subsystem is associated (e.g., an Internet services backend support subsystem may be configured to perform one or more diagnostic tests on Internet services provided by the business). In some examples, an operator (e.g., a user, an employee, an administrator, a customer service agent, etc.) of a backend support subsystem may utilize the backend support subsystem to perform one or more actions to address a support issue. For example, the operator may use the backend support subsystem to receive communications from the user who provided the support issue (e.g., access and/or search a social media outlet for support issues), send communications to the user (e.g., post a reply to the support issue by way of a social media outlet), initiate one or more tests (e.g., one or more diagnostic tests on services provided to the user), access and/or modify an account of the user (e.g., make one or more changes to the user's bill and/or the services accessible by the user), and/or any other suitable actions to address the support issue.

As used herein, a "social media outlet" may include any media outlet configured to facilitate interaction and/or the distribution of communications and/or content between one or more users. For example, social media outlets may include Internet-based applications configured to facilitate the creation and exchange of user-generated content. In some examples, social media outlets may include collaborative projects (e.g., Wikipedia), social networking sites (e.g., Myspace, Twitter, Facebook), media sharing sites (e.g., Flickr, YouTube), review/opinion sharing sites (e.g., epinions, WikiAnswers), Internet forums, blogs (e.g., weblogs, social blogs, microblogs), content communities, virtual game worlds, virtual communities, and/or any other type of social media outlet. The social media outlets may be configured to facilitate the distribution of posts (e.g., wall postings, blog postings), email, instant messages, and/or any other suitable communications or other content.

As used herein, "content" may refer generally to any content accessible by a user by way of a user access device. For example, content may include any data record or object (e.g., an electronic file) storing, including, or otherwise associated with a song, audio clip, movie, video, image, photograph, text, document, application file, or any segment, component, or combination of these or other forms of content that may be experienced or otherwise accessed by a user.

The methods and systems described herein may allow an organization to properly and proactively manage the organization's brand through social media outlets. For example, the methods and systems described herein may allow an organization to receive and address support issues by way of one or more social media outlets and manage support cases based on the received support issues. The methods and systems described herein may further allow an organization to assign support cases to departments and/or customer service agents capable of efficiently addressing the corresponding support issues. Additionally or alternatively, the methods and systems described herein may allow an organization to monitor actions performed (e.g., by assigned departments and/or agents of the organization) to address the support issues. By so doing, the organization may leverage the capabilities of social media outlets to protect and/or improve its brand.

FIG. 1 illustrates an exemplary social media management system (or simply "system 100") wherein a social media management subsystem 102 is communicatively coupled to a social media outlet 104 and one or more backend support subsystems 106-1 and 106-2 (collectively referred to herein as "backend support subsystems 106") by way of a network 108. In some examples, one or more operators of social media management subsystem 102 and backend support subsystems 106 may communicate with one or more users by way of social media outlet 104. Although FIG. 1 illustrates a single social media outlet 104 and two backend support subsystems 106, it will be understood that social media management subsystem 102 may be in communication with any number of social media outlets and/or backend support subsystems.

Social media management subsystem 102, social media outlet 104, and/or backend support subsystems 106 may communicate using any suitable communication technologies, devices, networks, media, and protocols supportive of remote data communications. For example, social media management subsystem 102, social media outlet 104, and/or backend support subsystems 106 may communicate over network 108 using any communication platforms and technologies suitable for transporting content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 108 may include one or more networks or types of networks (and communication links thereto) capable of carrying communications, media content, and/or data signals between social media management subsystem 102, social media outlet 104, and/or backend support subsystems 106. For example, network 108 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between social media management subsystem 102, social media outlet 104, and/or backend support subsystems 106. Communications between social media management subsystem 102, social media outlet 104, and/or backend support subsystems 106 may be transported using any one of the above-listed networks, or any combination or sub-combination of the above-listed networks.

Social media management subsystem 102 may include one or more computing devices (e.g., servers, personal computers, or other network-enabled devices) configured to execute computer-executable instructions (e.g., software applications) in order to perform one or more functions associated with social media management subsystem 102. For example, social media management subsystem 102 may include one or more servers and/or other computing devices configured to receive data representative of a support issue from social media outlet 104, establish a support case based on the support issue, generate a portal configured to facilitate management of a plurality of support cases including the support case, receive a request to assign the support case to one or more of backend support subsystems 106, transmit data representative of the support case to the one or more of backend support subsystems 106, and monitor one or more actions performed by the one or more of backend support subsystems 106 to address the support issue.

Likewise, social media outlet 104 and backend support subsystems 106 may each include one or more computing devices (e.g., servers, personal computers, or other network-enabled devices) configured to perform one or more of the functions disclosed herein.

In some examples, as shown in FIG. 1, social media management subsystem 102 may include or be in communication with an access device 110 configured to access and/or control one or more operations of social media management subsystem 102. For example, access device 110 may be configured to display a portal generated by social media management subsystem 102 so that an operator thereof (e.g., a user, an employee, an administrator, a customer service agent, etc.) may manage support cases maintained by social media management subsystem 102, as will be explained in more detail below. Access device 110 may include any suitable computing device such as, but not limited to, a personal computer, a communications device, a mobile device (e.g., a mobile phone device), a handheld device, and/or any other suitable computing device.

Additionally or alternatively, social media outlet 104 and backend support subsystems 106 may each include or be in communication with one or more access devices configured to facilitate access to and/or use of social media outlet 104, backend support subsystems 106, and/or social media management subsystem 102. For example, a user may utilize an access device to use social media outlet 104 and/or communicate with subsystems 102 and 106 by way of social media outlet 104. Additionally or alternatively, an operator may use an access device associated with backend support subsystems 106 to access the portal generated by social media management subsystem 102 and/or perform one or more actions to address a support issue provided by a user of social media outlet 104, as will be explained in more detail below.

Figure 2:
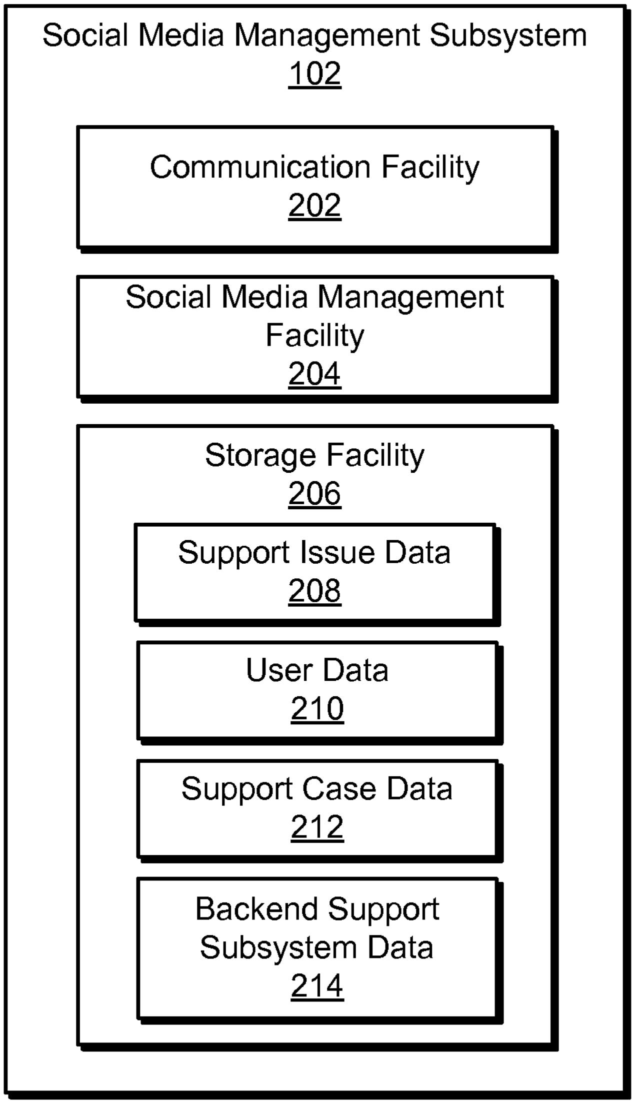
FIG. 2 illustrates an exemplary social media management subsystem of the system of FIG. 1 according to principles described herein.

FIG. 2 illustrates exemplary components of social media management subsystem 102. As mentioned above and as will be described in more detail below, social media management subsystem 102 may be configured to facilitate management of one or more support cases based on one or more support issues received by way of social media outlet 104. Social media management subsystem 102 may include, but is not limited to, a communication facility 202, a social media management facility 204, and a storage facility 206, which may be in communication with one another using any suitable communication technologies. It will be recognized that although facilities 202-206 are shown to be separate facilities in FIG. 2, any of those facilities may be combined into a single facility or split into additional facilities as may serve a particular implementation. Facilities 202-206 will now be described in more detail.

Communication facility 202 is configured to facilitate communication between social media management subsystem 102 and one or more computing devices (e.g., one or more access devices associated with one or more users and/or one or more access devices associated with or included within backend support subsystems 106). For example, communication facility 202 may be configured to facilitate communication between social media outlet 104 (e.g., an access device associated with a user of social media outlet 104), backend support subsystems 106, and/or one or more servers, databases, and/or other components that implement at least a portion of social media management subsystem 102.

In some examples, communication facility 202 may be configured to send and/or receive communications by way of one or more social media outlets. For example, communication facility 202 may be configured to receive data representative of a support issue by way of social media outlet 104. Communication facility 202 may be configured to receive the data representative of the support issue in any suitable manner as may serve a particular implementation.

For example, communication facility 202 may be configured to facilitate the searching of one or more social media outlets for support issues. To illustrate, an operator may utilize social media management subsystem 102 to search social media outlet 104 for communications satisfying one or more search criteria (e.g., containing one or more search terms) indicating that the communications represent and/or include one or more support issues. The searches may be configured to be one-time searches or may be configured to automatically recur at a predetermined frequency (e.g., hourly, daily, etc.). In some examples, social media management subsystem 102 may be configured to display the corresponding search results within a portal generated by social media management subsystem 102, as will be explained in more detail below.

In additional or alternative examples, social media management subsystem 102 may be configured to receive a support issue directly from a user by way of social media outlet 104. For example, communication facility 202 may be configured to receive support issues by way of a social media outlet account corresponding to an organization associated with social media management subsystem 102. To illustrate, the organization may have a social media outlet account (e.g., a Facebook account) having a corresponding web page (e.g., a Facebook page) where users can visit and post support issues (e.g., post complaints and/or inquiries regarding goods or services provided by the organization). Accordingly, social media management subsystem 102 may receive the support issues directly from the users by way of the social media outlet account as opposed to searching for and finding communications directed to other recipients.

Social media management facility 204 may be configured to manage one or more support cases based on support issues provided by one or more users. For example, social media management facility 204 may be configured to establish a support case based on a support issue received by way of social media outlet 104. Social media management facility 204 may be configured to compile information (e.g., information related to the support issue and/or the user who provided the support issue) into the support case to assist one or more of backend support subsystem 106 and/or a corresponding agent in addressing the support issue. In some examples, social media management facility 204 may be configured to automatically compile at least a portion of the information. Additionally or alternatively, social media management facility 204 may be configured to facilitate the input of at least a portion of the information by an operator of social media management subsystem 102. The information may include any suitable information associated with the support issue and/or the user who provided the support issue, such as described herein.

Social media management facility 204 may be further configured to generate and display a portal configured to facilitate management of a plurality of support cases. For example, the portal may be configured to display information included within or associated with the support cases. To illustrate, the portal may display information associated with a support issue upon which a support case is based (e.g., information regarding the origin, content, and/or date of the support issue), information associated with the user who provided the support issue (e.g., contact information, account information, etc.), information associated with the support case itself (e.g., information regarding a status of the support case, information identifying an agent or department to which the support case has been assigned, etc.), information associated with one or more actions being performed to address the support issue (e.g., information regarding one or more communications between the user and an assigned agent, information related to steps being taken by the assigned agent, etc.), and/or any other suitable information included within and/or associated with the support case.

Additionally or alternatively, the portal may be configured to facilitate the performance of one or more operations to manage the support cases and/or one or more actions performed to address the corresponding support issues. For example, the portal may include one or more selectable options associated with corresponding operations or actions to be performed by social media management subsystem 102 and/or backend support subsystems 106. To illustrate, the portal may include selectable options to initiate a search for support issues by way of social media outlet 104, to send/receive communications between subsystems 102 and 106, to send/receive communications to/from a user of social media outlet 104, to create a support case based on a support issue received by communication facility 102, to input and/or update information associated with a support case, to assign or reassign a support case to a particular backend support subsystem 106, and/or to perform any other suitable operation as may serve a particular implementation.

The portal may be further configured to display one or more graphical user interfaces ("GUIs") with which an operator of social media management subsystem 102 and/or one or more operators of backend support subsystems 106 may interface in order to manage the plurality of support cases and/or perform one or more actions to address the corresponding support issues. In some examples, the portal is web-based to facilitate remote access by multiple operators at different locations.

Social media management facility 204 may be further configured to receive a request to assign a support case to one or more backend support subsystems. For example, social media management facility 204 may receive a request to assign the support case to one or more of backend support subsystems 106. The request to assign the support case to the one or more backend support subsystems may be received in any suitable manner. For example, social media management facility 204 may be configured to receive the request by way of the portal (e.g., an operator of social media management subsystem 102 may use the portal to input the request). In some examples, the request may identify one or more backend support subsystems related to and/or having the resources to address the corresponding support issue. For example, if the support issue comprises an inquiry regarding a user's bill, an operator of social media management subsystem 102 may submit a request to assign the corresponding support case to one or more backend support subsystems associated with billing (e.g., one or more backend support subsystems associated with a billing department and/or with a billing customer service agent). In additional or alternative examples, the request may be received in any other suitable manner and may identify any suitable backend support subsystem(s).

Social media management facility 204 may also be configured to transmit, in response to a request, data representative of the support case to the one or more backend support subsystems. For example, in response to a request, social media management facility 204 may be configured to transmit data representative of a support case to one or both of backend support subsystems 106. The data representative of the support case may be transmitted to the one or more backend support subsystems in any suitable manner as may serve a particular implementation. For example, social media management facility 204 may transmit the data representative of the support case to one or both backend support subsystems 106 over network 108. In some examples, the data representative of the support case may be delivered by way of the portal generated by social media management facility 204.

Social media management facility 204 may be further configured to monitor one or more actions performed by the one or more backend support subsystems to address the support issue. For example, social media management facility 204 may be configured to monitor one or more actions performed by backend support subsystems 106. In some examples, social media management facility 204 may be configured to receive data representative of the one or more actions and display corresponding information within the portal generated by social media management facility 204. For example, social media management facility 204 may be configured to receive data representative of communications sent/received by the one or more backend support subsystems to/from the user and display the communications and associated information (e.g., information identifying the content, date, time, source, author, and/or recipient of the communications) within the portal. Additionally or alternatively, social media management facility 204 may be configured to receive data representative of any other suitable actions (e.g., any actions described herein) being performed to address the support issue. In this manner, an operator of social media management subsystem 102 can view information associated with and supervise the progress of the actions being performed to address the support issue.

Additionally or alternatively, social media management facility 204 may be configured to facilitate communication between an operator of social media management subsystem 102 and one or more operators of backend support subsystems 106. For example, social media management facility 204 may be configured to generate and display (e.g., within the portal) one or more chat windows configured to receive and display messages provided by the operator of social media management subsystem 102 and messages provided by the one or more operators of backend support subsystems 106. Additionally or alternatively, social media management facility 204 may be configured to facilitate any other suitable communications (e.g., instant messages, emails, etc.) between the operator of social media management subsystem 102 and the one or more operators of backend support subsystems 106.

In some examples, social media management facility 204 may be configured to facilitate communication between an operator of social media management subsystem 102 and the user who provided the support issue. For example, social media management facility 204 may be configured to allow an operator of social media management subsystem 102 to post a reply to a support issue provided by the user, send an email to the user, send an instant message to the user, chat with the user, and/or to communicate with the user in any other suitable manner.

In additional or alternative examples, social media management facility 204 may be configured to transmit data representative of one or more promotional offers to one or more users by way of one or more social media outlets. The promotional offer may include a special discount on a good or service, access to a limited good or service, and/or any other promotion or special offer. In some examples, a promotional offer may be associated with a support issue received from a user. For example, in response to receiving a support issue comprising an inquiry into services provided by one or more backend support subsystems, social media management facility 204 may be configured to receive a promotional offer associated with the inquired-about services from the one or more backend support subsystems and transmit the data representative of the promotional offer to the user who provided the inquiry. Promotional offers may also be configured to repair and/or foster good will with users that have been unsatisfied with an organization's goods or services. For example, in response to a complaint received from a user, social media management facility 204 may be configured to transmit a promotional offer to the user to compensate the user for time or money lost and/or frustration suffered.

Storage facility 206 may be configured to maintain support issue data 208 representative of one or more support issues, user data 210 representative of one or more users who provided the one or more support issues, support case data 212 representative of one or more support cases, and backend support subsystem data 214 representative of information associated with one or more backend support subsystems, one or more departments and/or agents associated with the one or more backend support subsystems, and/or one or more actions performed by the one or more backend support subsystems. It will be recognized that storage facility 206 may maintain additional or alternative data as may serve a particular implementation.

Figure 3:
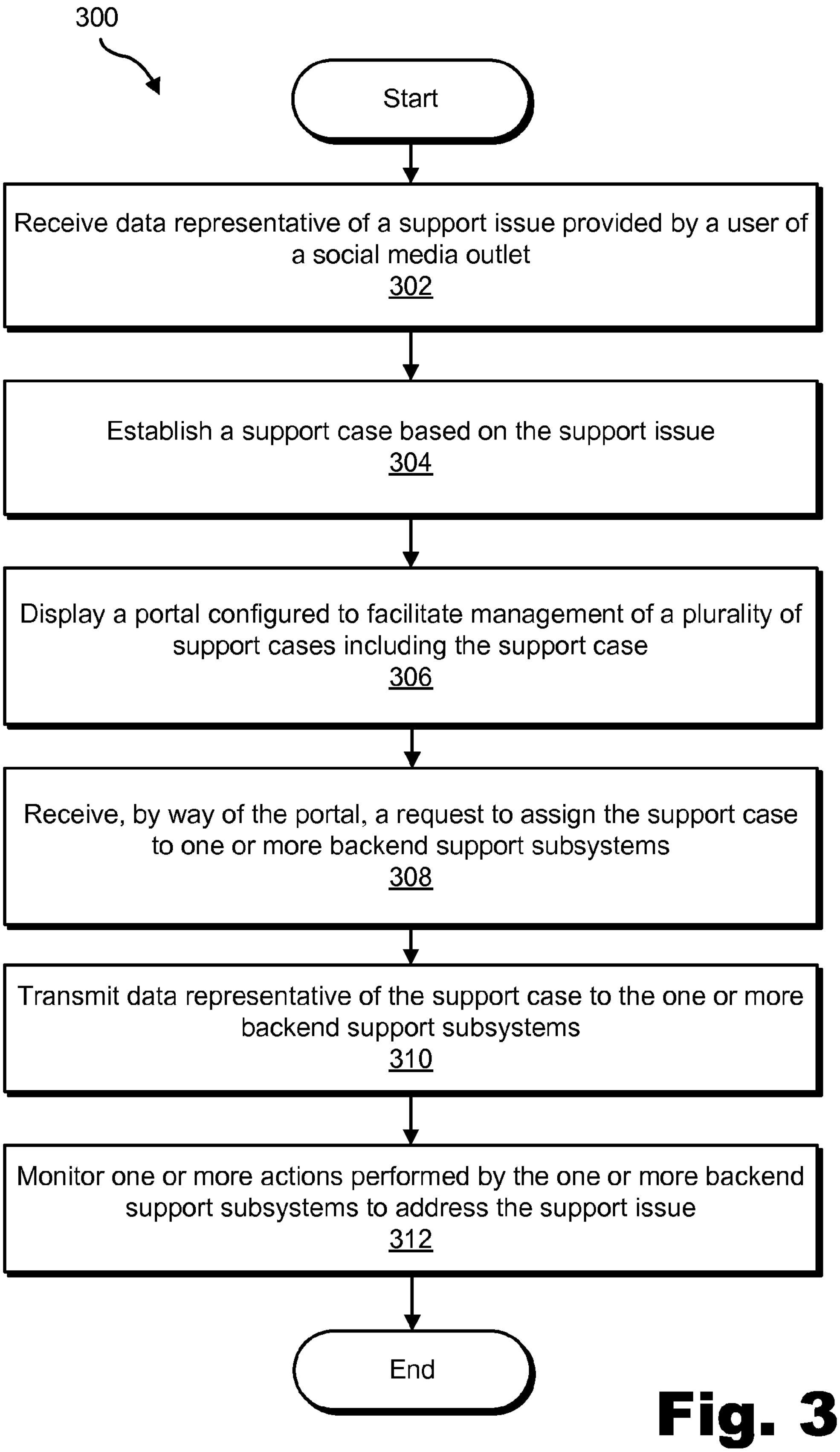
FIG. 3 illustrates an exemplary method of social media management according to principles described herein.

FIG. 3 illustrates an exemplary method 300 of managing support cases based on support issues received by way of social media outlets. While FIG. 3 illustrates exemplary steps according to one embodiment, other embodiments may omit, add to, reorder, and/or modify any of the steps shown in FIG. 3. The steps shown in FIG. 3 may be performed by any component of social media management subsystem 102.

In step 302, a social media management subsystem receives data representative of a support issue provided by a user of a social media outlet. The support issue may be received by social media management subsystem 102 in any suitable manner as may serve a particular implementation. For example, communication facility 202 may receive the support issue by way of social media outlet 104 in any suitable manner, such as described herein. In some examples, social media management subsystem 102 may be configured to display one or more received support issues within a portal, as will be described in more detail below.

In step 304, the social media management subsystem establishes a support case based on the support issue. Social media management subsystem 102 may be configured to establish the support case automatically in response to receiving the support issue, in response to an input command received from an operator, or in any other suitable manner. In some examples, establishing the support case may include compiling and storing information associated with the support issue and/or the user within one or more electronic files. In some examples, social media management facility 204 may be configured to generate and display a portal including one or more selectable and/or form-fillable options for establishing the support case, as will be explained in more detail below.

In step 306, the social media management subsystem displays a portal configured to facilitate management of a plurality of support cases including the support case established in step 304. Social media management subsystem 102 may be configured to generate and display the portal in any suitable manner. For example, social media management facility 204 may be configured to generate the portal for display by an access device included within or associated with social media management subsystem 102 and/or on one or more access devices included within or associated with backend support subsystems 106. An exemplary portal that may be generated and displayed by social media management facility 204 will be described in more detail below.

In step 308, the social media management subsystem receives a request to assign the support case to one or more backend support subsystems. The request may be received by social media management subsystem 102 in any suitable manner as may serve a particular implementation. For example, an operator of social media management subsystem 102 may input a request by way of the portal generated by social media management facility 204, as will be described in more detail below.

In step 310, the social media management subsystem transmits data representative of the support case to the one or more backend support subsystems in response to the request. For example, social media management subsystem 102 may transmit the data representative of the support case to one or more of backend support subsystems 106 in any suitable manner, such as described herein. In some examples, transmitting the data representative of the support case to the one or more backend support subsystems may include providing the one or more backend support subsystems with access to the portal generated by social media management facility 204.

In step 312, the social media management subsystem monitors one or more actions performed by the one or more backend support subsystems to address the support issue. For example, social media management facility 204 may be configured to monitor one or more actions performed by backend support subsystems 106 to address the support issue. In some examples, monitoring the one or more actions performed by the one or more backend support subsystems may include detecting the one or more actions and displaying information related to the one or more actions within the portal displayed in step 306.

To illustrate, an operator (e.g., an agent assigned to the support case) associated with the one or more backend support subsystems may send one or more communications to the user who provided the support issue (e.g., post a reply to the support issue), send/receive communications (e.g., chat messages, emails, instant messages) to/from an operator of social media management subsystem 102 or another backend support subsystem (e.g., in an effort to resolve the support issue), send an information request to the user who provided the support issue (e.g., send the user a uniform resource locator ("URL") to a secured website configured to receive input of the user's information so that the operator can identify the user and/or access the user's account), update a status of the support case (e.g., indicate that a support case is "closed" once the corresponding support issue has been satisfactorily addressed), input information associated with actions performed by the one or more backend support subsystems (e.g., diagnostic tests, account modifications, billing modifications, etc.), reassign the support case to another backend support subsystem, and/or any other suitable action. Social media management facility 204 may monitor these actions by detecting the actions and displaying information related to (e.g., descriptive of) the actions within the portal. Social media management subsystem 102 may be configured to monitor the actions in any other suitable manner.

An exemplary implementation of method 300 will now be given in connection with FIGS. 4-7. FIGS. 4-7 illustrate exemplary views of a portal that may be generated and displayed by social media management facility 204. As will be described in more detail below, one or more operators may utilize the portal shown in FIGS. 4-7 to manage a plurality of support cases and/or perform one or more actions to address corresponding support issues. It will be recognized that the exemplary views shown in FIGS. 4-7 are merely illustrative and that they may be modified, changed, or added to in any way as may serve a particular implementation.

Figure 4:
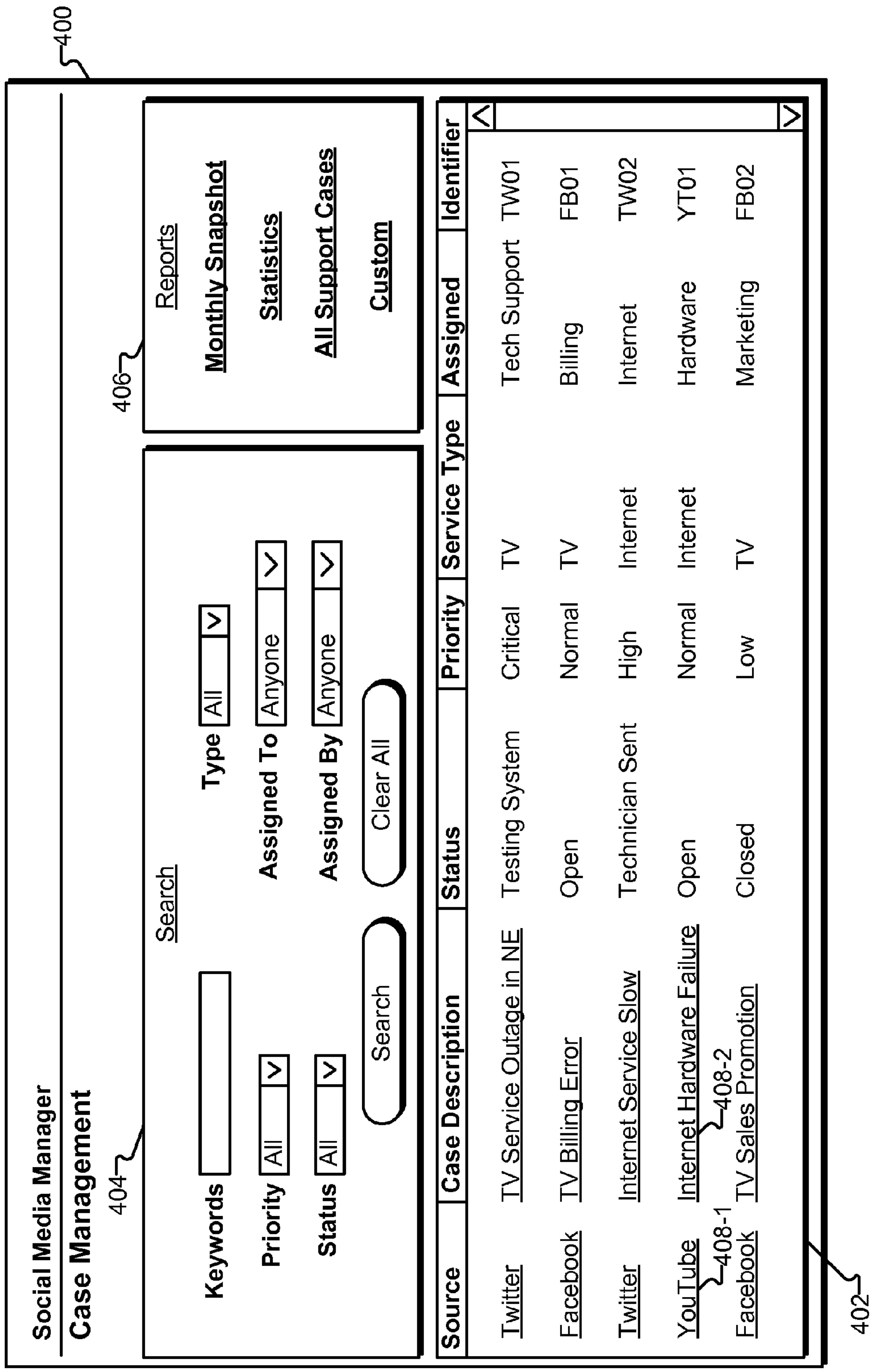
FIGS. 4-7 illustrate various views of an exemplary portal that may be configured to facilitate social media management according to principles described herein.

FIG. 4 illustrates an exemplary portal 400 that may be generated and displayed by social media management facility 204 on a display screen of an access device and that may be configured to facilitate management of a plurality of support cases based on corresponding support issues received by way of one or more social media outlets. Portal 400 may be displayed within a web-browser, a stand-alone application, and/or any other application as may serve a particular implementation.

As shown in FIG. 4, portal 400 may display a list 402 of one or more support cases currently being managed by social media management facility 204. List 402 may include information associated with each support case such as, but not limited to, a source of a support issue upon which each support case is based, a description of each support case, a status of each support case, a priority of each support case, a service type associated with each support case, a department assigned to each support case, a unique identifier assigned to each support case, and/or any other suitable information. In this manner, an operator may readily view information associated with a particular support case by locating the particular support case in list 402.

It will be recognized that a relatively large number of support cases (e.g., thousands) may be included in list 402. To assist an operator in accessing information associated with a particular support case, various search options 404 may be displayed in portal 400. As shown in FIG. 4, search options 404 may include various search filters configured to narrow the number of entries in list 402 based on operator input. Any number of search options 404 may be included within portal 400 as may serve a particular implementation.

Portal 400 may additionally or alternatively include a number of selectable options associated with the support cases being managed by social media management subsystem 102. For example, an operator may select one or more of reports 406 to generate one or more reports corresponding to one or more support cases.

In some examples, a support case included within list 402 may be selected by an operator to access additional information associated with that support case. To this end, one or more hyperlinks or the like may be included within list 402. For example, hyperlinks 408-1 and/or 408-2 may be selected to access additional information associated with a support case having a case description of "Internet Hardware Failure."

Figure 5:
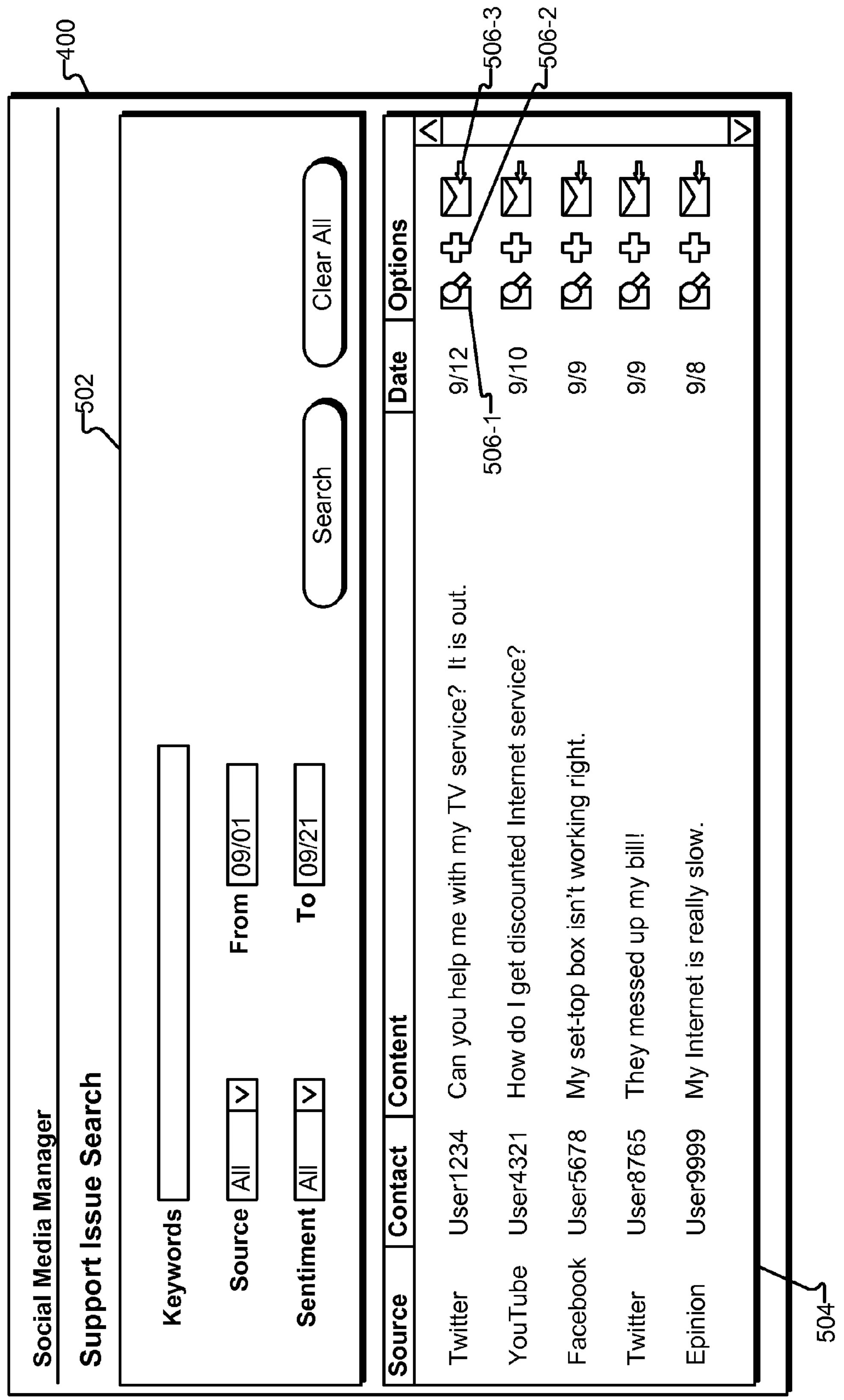

Each of the support cases listed in list 402 may be based on support issues received by way of one or more social media outlets. For example, FIG. 4 illustrates support cases based on support issues received by way of Twitter, Facebook, and YouTube. Portal 400 may be further configured to facilitate searching for and/or otherwise receiving support issues by way of the social media outlets. For example, FIG. 5 shows portal 400 displaying one or more search options 502 configured to facilitate the performance of one or more searches by way of portal 400. As shown in FIG. 5, search options 502 may include various search filters configured to find social media communications including and/or representing one or more support issues. Any number of search options 502 may be included within portal 400 as may serve a particular implementation. The searches may be configured to run a single time or automatically at a selected frequency (e.g., hourly, daily, etc.).

Search results including a plurality of support issues may be displayed in list 504. List 504 may include information associated with each support issue such as, but not limited to, a source of each support issue, contact information for the user who provided each support issue, the content of each support issue (e.g., the content of a communication associated with the support issue), a date and/or time of each support issue, and/or any other information associated with each support issue. Portal 400 may also include one or more selectable options 506-1 through 506-3 (collectively referred to herein as "selectable options 506") associated with each support issue. For example, portal 400 may include a first selectable option 506-1 configured to allow an operator to access additional information associated with a support issue from a user identified as "User1234," a second selectable option 506-2 configured to allow an operator to create a support case based on the support issue, and a third selectable option 506-3 configured to allow an operator to post a reply in response to the support issue. Portal 400 may be further configured to include any other suitable options as may serve a particular implementation.

Figure 6:
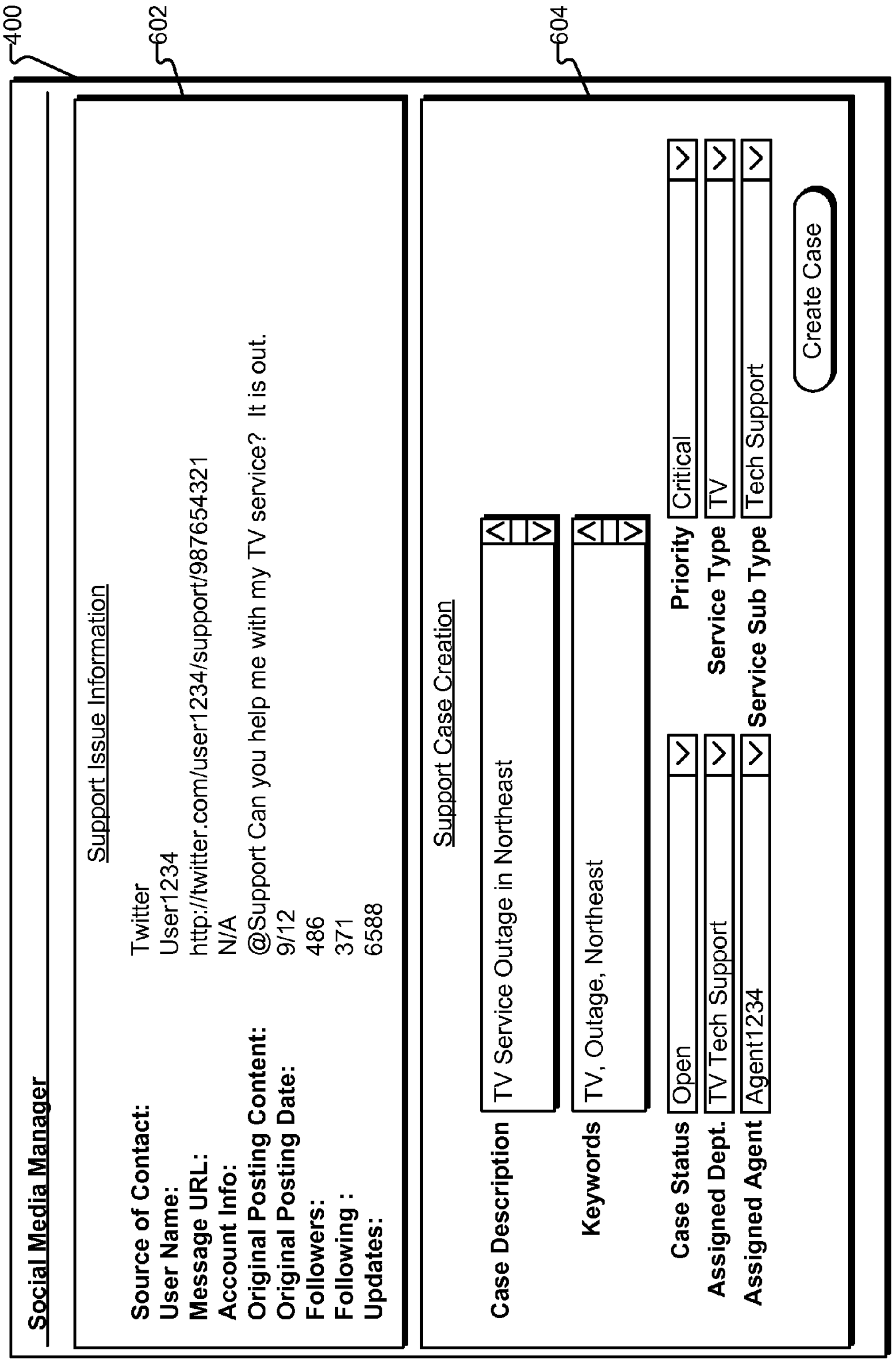

As shown in FIG. 6, portal 400 may display (e.g., in response to an operator selection of first selectable option 506-1) additional information 602 associated with the support issue provided by "User1234." Additional information 602 may include any suitable additional information associated with the support issue. For example, additional information 602 may include a message URL corresponding to the support issue, account information for User1234 (if available), the number of followers that User1234 has, the number of users User1234 is following, the number of updates User1234 has provided, and/or any other suitable information.

Additionally or alternatively, to facilitate the creation of a support case based on the support issue provided by User1234, portal 400 may include support case creation options 604 (or simply "options 604"). In some examples, options 604 may be displayed in response to an operator selection of second selectable option 506-2. Options 604 may include various options configured to allow an operator to establish a support case (e.g., a support case based on the support issue provided by User1234). For example, an operator may utilize options 604 to input a case description for the support case, input keywords to be associated with the support case, select a case status for the support case, assign the support case to a particular department and/or agent, set a priority for the support case, select a service type and/or service sub-type associated with the support case, and/or create the support case. Options 604 may include any other suitable options as may serve a particular implementation.

Figure 7:
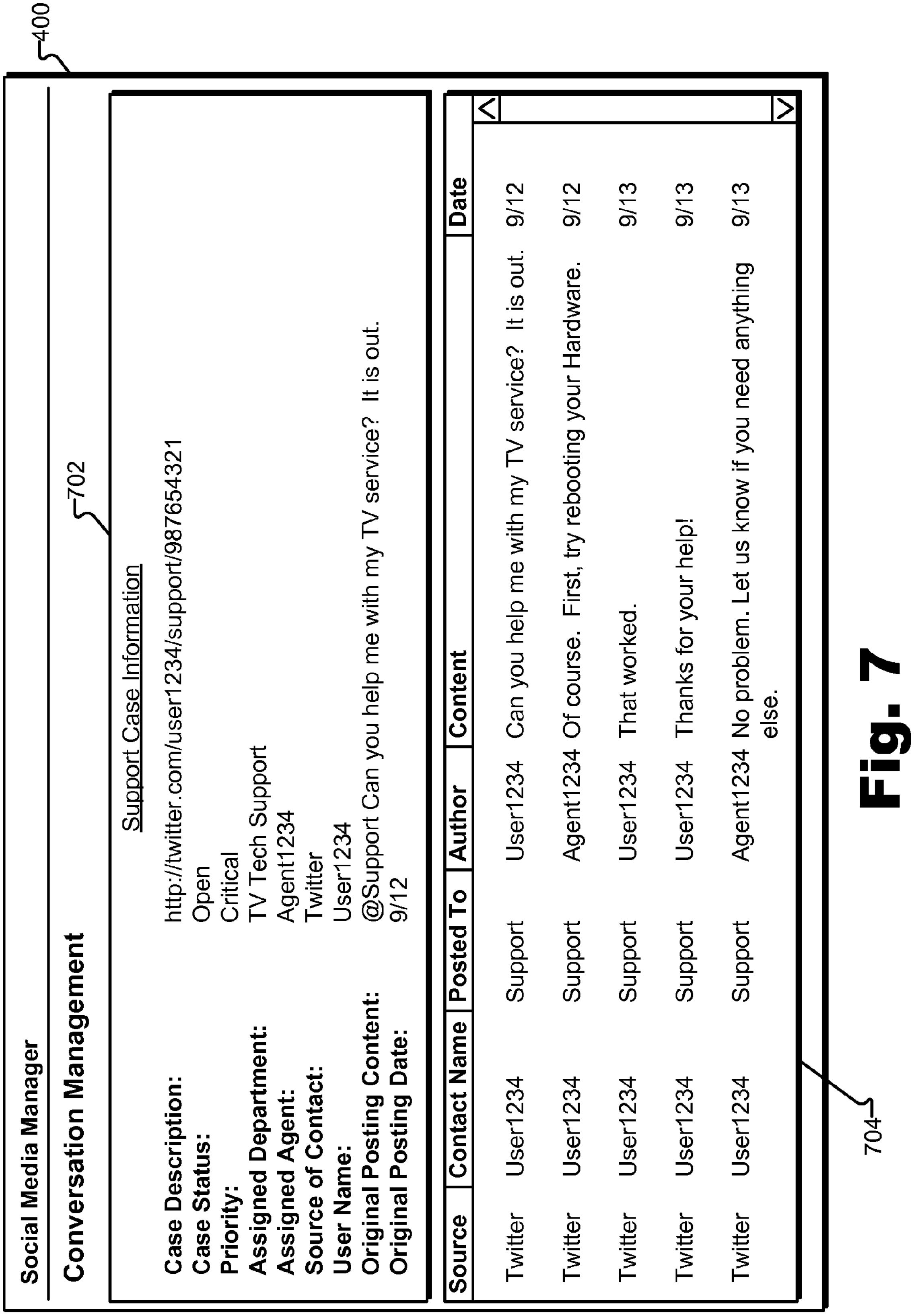

Once a support case has been created, portal 400 may be configured to display information associated with the support case and/or associated with one or more actions performed to address a corresponding support issue. For example, as shown in FIG. 7, portal 400 may include support case information 702. Support case information 702 may include any suitable information associated with the support case and/or the corresponding support issue. For example, support case information 702 may include a case description, a case status, a priority, an assigned department, an assigned agent, a source of the support issue, a user name of the user who provided the support issue, the original posting content provided by the user, the date of the original posting, and/or any other suitable information.

In addition, portal 400 may include a list 704 of communications between the user who provided the support issue and an assigned agent (e.g., an agent associated with an assigned backend support subsystem). List 704 may include information associated with each communication such as, but not limited to, a source of each communication, a contact name for the user, a webpage or social media outlet account to which each communication was posted, an author of each communication, the content of each communication, a date and/or time of each communication, and/or any other suitable information. Accordingly, an operator of social media management subsystem 102 may easily review information associated with the support case and/or monitor the one or more actions being performed to address the corresponding support issue.

Portal 400 may display various additional or alternative options associated with the support case. For example, portal 400 may include options through which a user (e.g., an administrator or assigned agent) may reassign the support case to a different agent, update a status of the support case, input one or more notes related to the support case, update a priority of the support case, and/or modify any other aspect of the support case as may serve a particular implementation.

Figure 8:
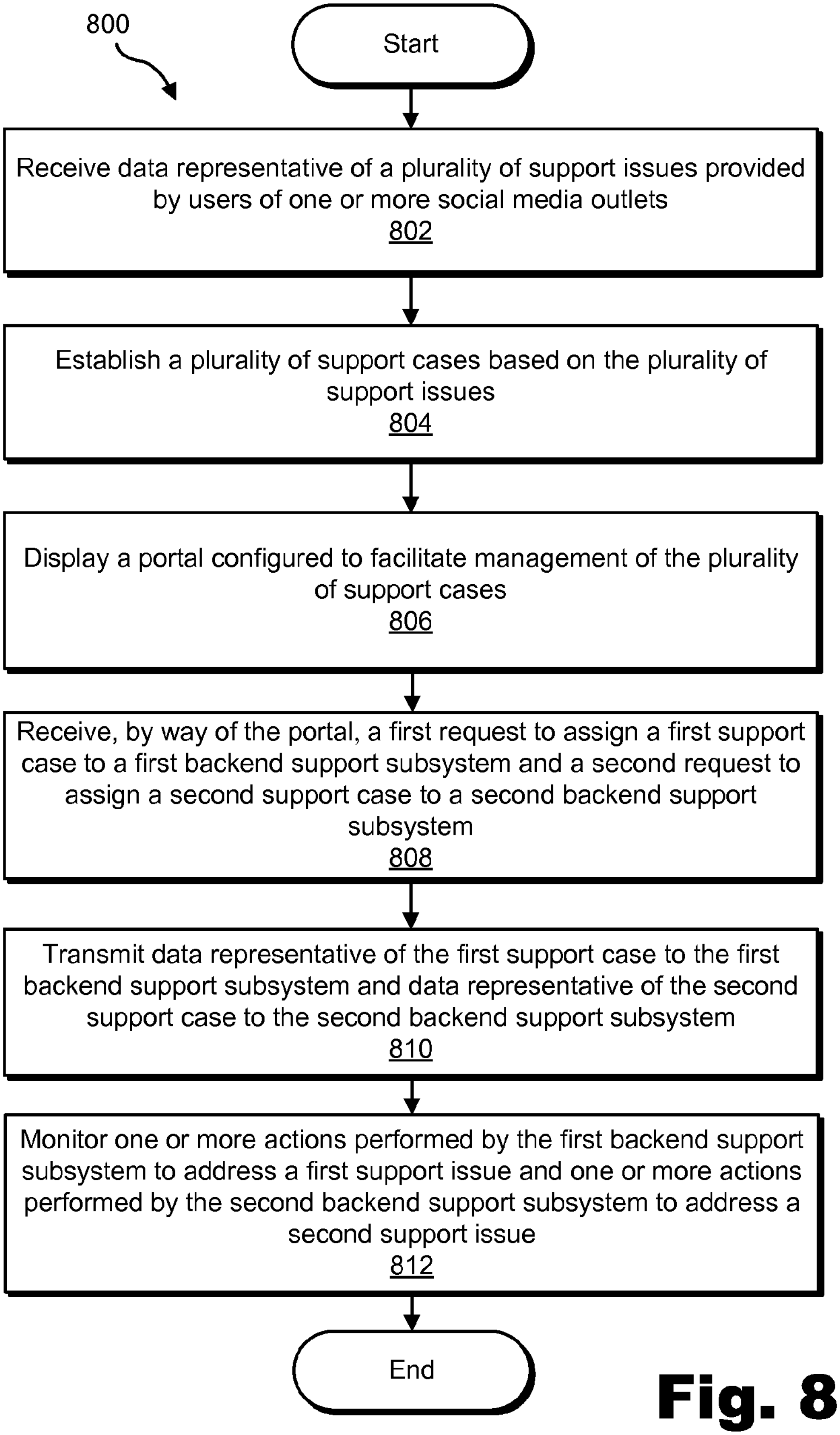
FIG. 8 illustrates another exemplary method of social media management according to principles described herein.

FIG. 8 illustrates another exemplary method 800 of managing support cases based on support issues received by way of social media outlets. While FIG. 8 illustrates exemplary steps according to one embodiment, other embodiments may omit, add to, reorder, and/or modify any of the steps shown in FIG. 8. The steps shown in FIG. 8 may be performed by any component of social media management subsystem 102.

In step 802, a social media management subsystem receives data representative of a plurality of support issues provided by users of one or more social media outlets. In some examples, the plurality of support issues may include a first support issue and a second support issue. The data representative of the plurality of support issues may be received in any suitable manner, such as described herein.

In step 804, the social media management subsystem establishes a plurality of support cases based on the plurality of support issues. In some examples, the plurality of support cases may include a first support case based on the first support issue and a second support case based on the second support issue. The plurality of support cases may be established in any suitable manner, such as described herein.

In step 806, the social media management subsystem displays a portal configured to facilitate management of the plurality of support cases. The social media management subsystem may be configured to generate and display the portal in any suitable manner, such as described herein.

In step 808, the social media management subsystem receives a first request to assign the first support case to a first backend support subsystem and a second request to assign the second support case to a second backend support subsystem. The social media management subsystem may receive the first and second requests in any suitable manner, such as described herein.

In step 810, the social media management subsystem transmits data representative of the first support case to the first backend support subsystem and data representative of the second support case to the second backend support subsystem. The social media management subsystem may be configured to transmit the data representative of the first and second support cases to the first and second backend support subsystems, respectively, in any suitable manner, such as described herein.

In step 812, the social media management subsystem monitors one or more actions performed by the first backend support subsystem to address a first support issue and one or more actions performed by the second backend support subsystem to address a second support issue. The social media management subsystem may be configured to monitor the actions performed by the first and second backend support subsystems in any suitable manner, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
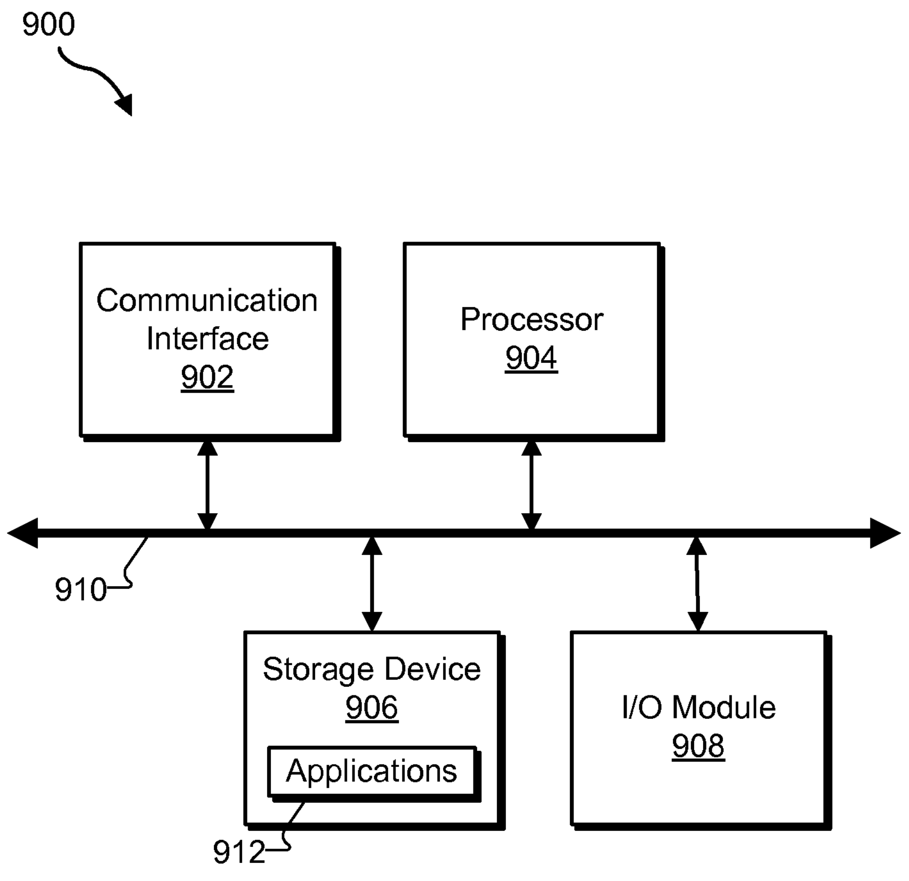
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more of provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein.

Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with communication facility 202 and/or social media management facility 204. Likewise, storage facility 206 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

searching, by a social media management subsystem associated with an organization, a social media outlet, with which the organization has a social media account, for a social media communication provided by a user of the social media outlet and representing a support issue associated with the organization, the social media outlet being provided by an entity other than the organization;

receiving, by the social media management subsystem and in response to the searching of the social media outlet, data representative of the support issue associated with the organization;

establishing, by the social media management subsystem in response to receiving the data representative of the support issue associated with the organization by way of the social media outlet, a support case based on the support issue;

generating and displaying, by the social media management subsystem, a portal associated with the organization and configured to facilitate management of a plurality of support cases associated with the organization and including the support case;

receiving, by the social media management subsystem by way of the portal, a request to assign the support case to one or more backend support subsystems associated with the organization;

transmitting, by the social media management subsystem in response to the request, data representative of the support case to the one or more backend support subsystems; and receiving, by the social media management subsystem and from the one or more backend support systems, data representative of a promotional offer associated with the support issue; and transmitting, by the social media management subsystem, the data representative of the promotional offer to the user by way of the social media outlet.

2. The method of claim 1, wherein the searching the social media outlet comprises:

receiving data representative of one or more search criteria; and searching the social media outlet in accordance with the one or more search criteria.

3. The method of claim 2, wherein the searching further comprises:

receiving a selected search frequency; and automatically searching the social media outlet in accordance with the selected search frequency.

4. The method of claim 1, wherein the receiving the data representative of the support issue comprises receiving the data representative of the support issue by way of the social media outlet account of the organization with the social media outlet.

5. The method of claim 4, wherein the social media communication representing the support issue is posted by the user to a web page associated with the social media outlet account.

6. The method of claim 1, wherein the establishing the support case comprises establishing at least one electronic file configured to maintain information associated with at least one of the support issue, the user, and the support case.

7. The method of claim 6, wherein at least a portion of the information is provided by an operator of the social media management subsystem by way of the portal.

8. The method of claim 6, further comprising:

transmitting, by the social media management subsystem to the user, data representative of an information request for at least a portion of the information;

receiving, by the social media management subsystem in response to the information request, the at least a portion of the information; and storing, by the social media management subsystem, the at least a portion of the information in the at least one electronic file.

9. The method of claim 8, wherein:

the request for information comprises a uniform resource locator ("URL") of a secure website configured to facilitate input of the at least a portion of the information by the user, and the receiving the at least a portion of the information comprises receiving the at least a portion of the information by way of the secure website.

10. The method of claim 1, wherein each of the one or more backend support subsystems is associated with one or more departments or agents of the organization.

11. The method of claim 1, wherein the one or more backend support subsystems comprise at least one of a backend billing subsystem, a backend technical support subsystem, a backend marketing subsystem, and a backend customer service subsystem.

12. The method of claim 1, wherein the transmitting of the data representative of the support case to the one or more backend support subsystems comprises providing the one or more backend support subsystems with access to the support case by way of the portal.

13. The method of claim 1, further comprising displaying, by the social media management subsystem, information related to the one or more actions by way of the portal.

14. The method of claim 1, wherein the one or more actions comprise sending one or more communications configured to address the support issue.

15. The method of claim 1, further comprising facilitating, by the social media management subsystem, communication between an operator of the social media management subsystem and an operator of the one or more backend support subsystems.

16. The method of claim 15, wherein the facilitating the communication between the operator of the social media management subsystem and the operator of the one or more backend support subsystems comprises displaying a chat window within the portal, the chat window configured to receive and display messages provided by the operator of the social media management subsystem and messages provided by the operator of the one or more backend support subsystems.

17. The method of claim 1, embodied as computer-executable instructions on at least one non-transitory computer-readable medium.

18. A method comprising:

generating, by the social media management subsystem, a portal associated with an organization;

receiving, by the social media management system by way of the portal, a command to search a plurality of social media outlets with which the organization has a social media account, the social media outlets being provided by one or more entities other than the organization;

searching, by a social media management subsystem, the social media outlets for a plurality of social media communications provided by one or more users of the social media outlet and representing a plurality of support issues associated with the organization;

receiving, by the social media management subsystem and in response to the searching of the one or more social media outlets, data representative of a first social media communication provided by a first user by way of a first social media outlet included in the plurality of social media outlets and a second social media communication provided by a second user by way of a second social media outlet included in the plurality of social media outlets, the first social media communication representing a first support issue corresponding to the first user and the second social media communication representing a second support issue corresponding to the second user;

establishing, by the social media management subsystem in response to receiving the data representative of the first and second social media communications a first support case based on the first support issue and a second support case based on the second support issue;

displaying, by the social media management subsystem, and within the portal, data representative of the first and second support cases;

receiving, by the social media management subsystem by way of the portal, a first request to assign the first support case to a first backend support subsystem associated with the organization and a second request to assign the second support case to a second backend support subsystem associated with the organization;

transmitting, by the social media management subsystem in response to the first request and the second request, data representative of the first support case to the first backend support subsystem and data representative of the second support case to the second backend support subsystem;

receiving, by the social media management subsystem and from the first backend support subsystem, data representative of a promotional offer associated with the first support issue; and transmitting, by the social media management subsystem, the data representative of the promotional offer to the first user by way of the first social media outlet.

19. A system comprising:

a communication facility associated with an organization and that searches a social media outlet, with which the organization has a social media account, for a social media communication provided by a user of the social media outlet and representing a support issue associated with the organization, the social media outlet being provided by an entity other than the organization, and receives, by way of the social media outlet and in response to the searching of the social media outlet, data representative of the support issue associated with the organization; and a social media management facility associated with the organization, selectively and communicatively coupled to the communication facility, and that establishes a support case based on the support issue in response to the communication facility receiving the data representative of the support issue associated with the organization by way of the social media outlet, generates and displays a portal associated with the organization to facilitate management of a plurality of support cases associated with the organization and including the support case, receives, by way of the portal, a request to assign the support case to one or more backend support subsystems associated with the organization, transmits, in response to the request, data representative of the support case to the one or more backend support subsystems, receives, from the one or more backend support systems, data representative of a promotional offer associated with the support issue, and transmits the data representative of the promotional offer to the user by way of the social media outlet.

20. The system of claim 19, wherein the social media management facility displays data representative of the one or more actions within the portal.

21. The method of claim 1, further comprising:

displaying, by the social media management subsystem, within the portal, a first selectable option configured to allow an operator associated with the organization access to additional information associated with a support issue from the user, a second selectable option configured to allow the operator associated with the organization to create a support case based on the support issue, and a third selectable option configured to allow the operator associated with the organization to post a reply to the user by way of the social media outlet in response to the support issue.

22. The method of claim 21, wherein the additional information includes at least one of account information associated with the user of the social media outlet, data representative of a number of followers associated with the user of the social media outlet, data representative of a number of other users who the user of the social media outlet is following, and data representative of a number of updates provided by the user of the social media outlet to the social media outlet.

23. The method of claim 1, wherein the portal is a standalone application not accessible through a web browser.

24. The method of claim 18, further comprising:

receiving, by the social media management subsystem and from the second backend support subsystem, data representative of a promotional offer associated with the second support issue; and transmitting, by the social media management subsystem, the data representative of the promotional offer to the second user by way of the second social media outlet.

* * * * *